United States Patent
Lu et al.

(10) Patent No.: US 11,493,332 B1
(45) Date of Patent: Nov. 8, 2022

(54) THREE-DIMENSIONAL SENSING SYSTEM FOR DETERMINING THREE-DIMENSIONAL PROFILE OF OBJECT AND METHOD THEREOF

(71) Applicant: HIMAX TECHNOLOGIES LIMITED, Tainan (TW)

(72) Inventors: Hsueh-Tsung Lu, Tainan (TW); Ching-Wen Wang, Tainan (TW); Cheng-Che Tsai, Tainan (TW); Wu-Feng Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/405,048

(22) Filed: Aug. 18, 2021

(51) Int. Cl.
  *G01B 11/25* (2006.01)
  *G06T 7/521* (2017.01)
  *G02B 27/42* (2006.01)
  *G02F 1/29* (2006.01)

(52) U.S. Cl.
  CPC .......... *G01B 11/254* (2013.01); *G02B 27/425* (2013.01); *G02F 1/29* (2013.01); *G06T 7/521* (2017.01); *G02F 2203/30* (2013.01); *G06T 2207/10028* (2013.01)

(58) Field of Classification Search
  CPC ....... G01B 11/254; G02B 27/425; G02F 1/29; G02F 2203/30; G06T 7/521; G06T 2207/10028
  See application file for complete search history.

(56) References Cited

U.S. PATENT DOCUMENTS

| | | | | |
|---|---|---|---|---|
| 10,827,163 B2* | 11/2020 | Trail | ..................... | H04N 13/344 |
| 10,891,745 B1* | 1/2021 | Potter | .................... | G01S 17/931 |
| 10,895,752 B1* | 1/2021 | Romano | .............. | G02B 5/1866 |
| 10,901,310 B2* | 1/2021 | Ma | ..................... | G02F 1/133502 |
| 11,022,813 B2* | 6/2021 | Ma | ..................... | G02B 5/1828 |
| 11,054,728 B1* | 7/2021 | Ollila | ................ | G02F 1/133365 |
| 11,195,291 B1* | 12/2021 | Li | ............................ | G06T 7/521 |
| 2013/0054187 A1* | 2/2013 | Pochiraju | .............. | G01S 7/4811 |
| | | | | 702/150 |
| 2018/0196998 A1* | 7/2018 | Price | ..................... | G06V 40/172 |
| 2018/0285673 A1* | 10/2018 | Arnold | ................ | G06V 10/145 |
| 2019/0101381 A1* | 4/2019 | Chen | .................... | G01B 11/254 |
| 2019/0339541 A1* | 11/2019 | Xu | ......................... | G03B 35/00 |
| 2020/0064642 A1* | 2/2020 | Du | ..................... | G02B 27/0944 |
| 2020/0228764 A1* | 7/2020 | Chen | ....................... | G02F 1/133 |
| 2020/0387004 A1* | 12/2020 | Xu | ......................... | G02B 27/48 |
| 2021/0203894 A1* | 7/2021 | Lu | ......................... | H04N 9/3105 |
| 2021/0264625 A1* | 8/2021 | Atanassov | ............... | G06T 7/521 |
| 2022/0252893 A1* | 8/2022 | Hsiao | .................... | G06V 10/141 |

* cited by examiner

*Primary Examiner* — Fernando Alcon
(74) *Attorney, Agent, or Firm* — Winston Hsu (57) ABSTRACT

A three-dimensional (3D) sensing system for determining a 3D profile of an object and a method are provided. The 3D sensing system includes a liquid crystal lens, a structure light source and a control circuit. The structure light source is configured to emit a structure light pattern with a plurality of dots on the object through the liquid crystal lens. The control circuit is configured to control the liquid crystal lens to separate the plurality of dots under a separating mode, and the control circuit is configured to control the liquid crystal lens to overlap the plurality of dots under an overlapping mode.

18 Claims, 9 Drawing Sheets

Separating mode

141

Overlapping mode

THREE-DIMENSIONAL SENSING SYSTEM FOR DETERMINING THREE-DIMENSIONAL PROFILE OF OBJECT AND METHOD THEREOF

BACKGROUND OF THE INVENTION

1. Field of the Invention

The present invention is related to object detection and identification, and more particularly, to a three-dimensional (3D) sensing system and associated method for determining a 3D profile of an object under ambient light.

2. Description of the Prior Art

Nowadays, the three-dimensional (3D) sensing technology has many related applications (e.g., facial identity scan). There are different methods of 3D sensing such as Time of Flight (TOF), dual camera, structured light, etc., wherein the method of structured light is projecting a specific designed dot pattern through Vertical-Cavity Surface-Emitting Laser (VCSEL) and diffractive optical elements (DOE). Then, a processor analyzes the result of shifting of various distances between dots of the light dot pattern, to determine a depth between the dot and the camera. Through the design of DOE and adjustment of array of VCSEL, the object may also be uniformly illuminated, such that the VCSEL and the DOE are used as a two-dimensional (2D) light source. When performing facial identity scan, generally 2D photos and 3D sensing results can be used as the basis for the facial identity scan. However, under different usage scenarios and environments, the information of the light source will be affected by ambient noise, such as strong ambient light. For example, due to the influence of sunlight, the received information of light is covered by sunlight, such that the light dot pattern cannot be identified and analyzed. As a result, the structured light cannot accurately measure the depth of objects under strong sunlight. Thus, a novel method and associated system are needed for solving the problems without introducing any side effect or in a way that is less likely to introduce a side effect.

SUMMARY OF THE INVENTION

It is therefore an objective of the present invention to provide a 3D sensing system and a method for determining 3D profile of an object with improved signal-to-noise ratio At least one embodiment of the present invention provides a three-dimensional (3D) sensing system for determining a 3D profile of an object. The 3D sensing system includes a liquid crystal lens, a structure light source and a control circuit. The structure light source is configured to emit a structure light pattern with a plurality of dots on the object through the liquid crystal lens located between the structure light source and the object. The control circuit is electrically connected to the liquid crystal lens. The control circuit is configured to control the liquid crystal lens to separate the plurality of dots under a separating mode, and the control circuit is configured to control the liquid crystal lens to overlap the plurality of dots under an overlapping mode.

At least one embodiment of the present invention provides a method for determining a three-dimensional (3D) dimensional profile of an object. The method includes: in response to a liquid crystal lens under a separating mode, utilizing a structure light source to emit a structure light pattern with a plurality of dots on the object through the liquid crystal lens located between the structure light source and the object, and separating the plurality of dots of the structure light pattern at the liquid crystal lens; in response to the liquid crystal lens under an overlapping mode, utilizing the structure light source to emit the structure light pattern with the plurality of dots on the object through the liquid crystal lens located between the structure light source and the object, and overlapping the plurality of dots of the structure light pattern at the liquid crystal lens; and detecting the structure light pattern reflected from the object.

The present invention method and 3D sensing system can control the liquid crystal lens to enter the separating mode to improve the quality of depth image decoding, or to enter the overlapping mode to reduce the influence of ambient light (e.g., sunlight). When ambient noise is low, the liquid crystal lens is configured to separate the structure light to increase dots. When ambient noise is high due to, for example, strong ambient light, the liquid crystal lens is configured to overlap the dots of the structure light to increase the brightness of the structure light. Therefore, the 3D sensing system is able to adapt different usage scenarios and environments, and a signal-to-noise ratio of the structure light can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
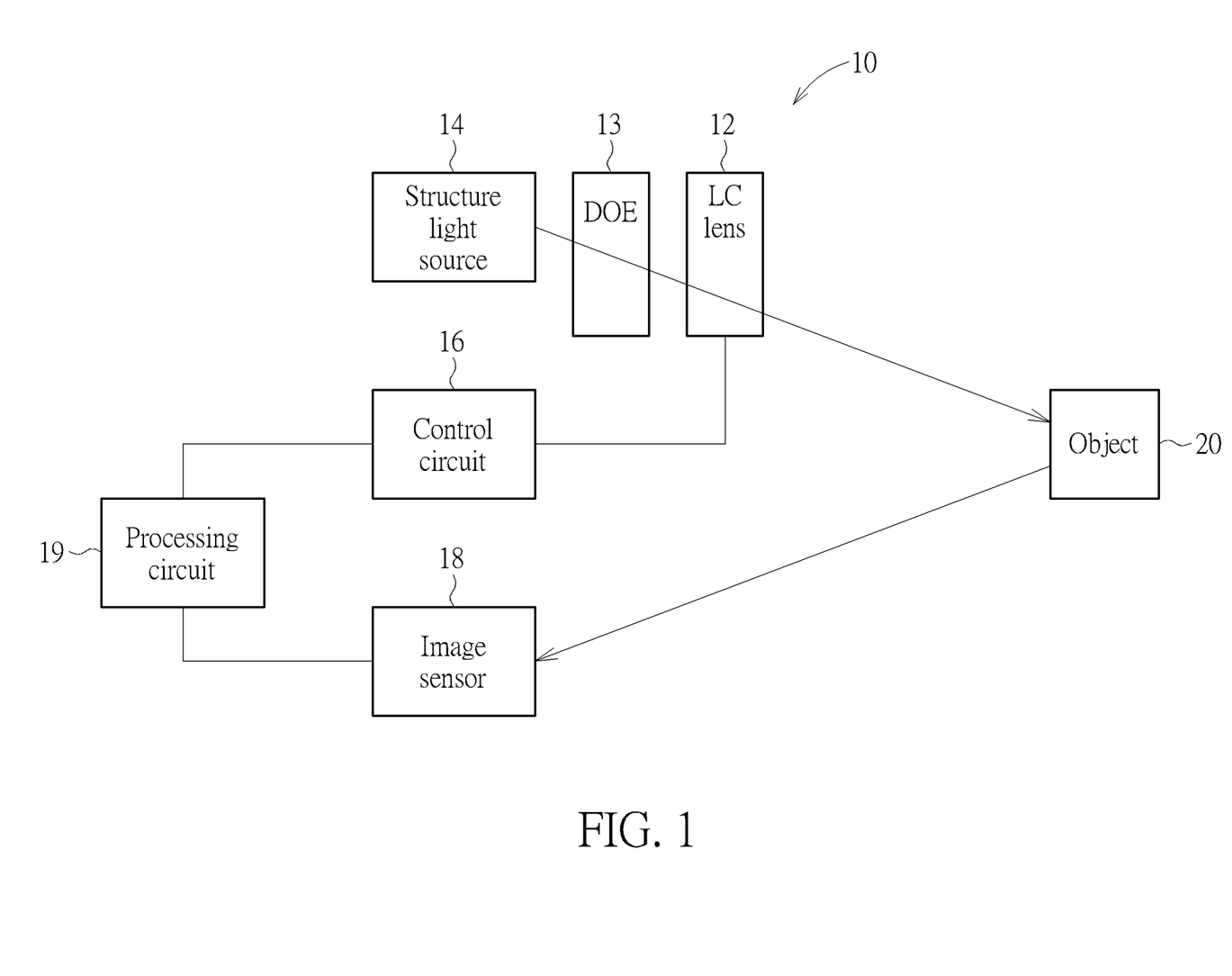
FIG. 1 is a diagram of a three-dimensional (3D) sensing system according to a first embodiment of the present invention.

Please refer to FIG. 1. FIG. 1 is a diagram of a three-dimensional (3D) sensing system 10 according to a first embodiment of the present invention. The 3D sensing system 10 of the first embodiment comprises a liquid crystal (LC) lens 12, a diffractive optical element (DOE) 13, a structure light source 14, a control circuit 16, an image sensor 18 and a processing circuit 19. The structure light source 14 is configured to emit a structure light pattern (such as a pattern with a plurality of dots) on an object 20 through the liquid crystal lens 12. The liquid crystal lens 12 is located between the structure light source 14 and the object 20. In this embodiment, the DOE 13 is located between the structure light source 14 and the liquid crystal lens 12, where the DOE 13 is configured to generate a light beam array. In some embodiments, the liquid crystal lens 12 may be located between the DOE 13 and the structure light source 14. The image sensor 18 is configured to detect the structure light pattern reflected from the object 20 to generate a structure light pattern image. The processing circuit 19 is electrically connected to the control circuit 16 and the image sensor 18. The processing circuit 19 is configured to process the structure light pattern image to generate a judge index. The control circuit 16 is electrically connected to the liquid crystal lens 12, and may act as a liquid crystal lens driver. In this embodiment, the control circuit 16 is configured to control the liquid crystal lens 12 to separate the structure light pattern under a separating mode, and is further configured to control the liquid crystal lens 12 to overlap the structure light pattern under an overlapping mode. For example, when the judge index obtained by the processing circuit 19 is greater than a predetermined threshold index, the control circuit 16 controls the liquid crystal lens 12 to enter the overlapping mode, such that the liquid crystal lens 12 overlaps the plurality of dots of structure light pattern under the separating mode; when the judge index obtained by the processing circuit 19 is smaller than the predetermined threshold index, the control circuit 16 controls the liquid crystal lens 12 to enter the separating mode, such that the liquid crystal lens 12 separates the plurality of dots of structure light pattern under the overlapping mode. In the present embodiment, the processing circuit 19 may be a depth processor, and may generate the judge index according to at least one of a depth decode rate, a signal-to-noise ratio of the structure light pattern image and an average brightness of the structure light pattern image, but the present invention is not limited thereto.

In some embodiments, the 3D sensing system 10 may comprise a plurality of LC lens located between the structure light source 14 and the object 20. For example, an auxiliary liquid crystal lens (not shown in FIG. 1) can be arranged between the DOE 13 and the structure light source 14. The structure light pattern can be separated or overlapped by the plurality of LC lens.

Figure 2:
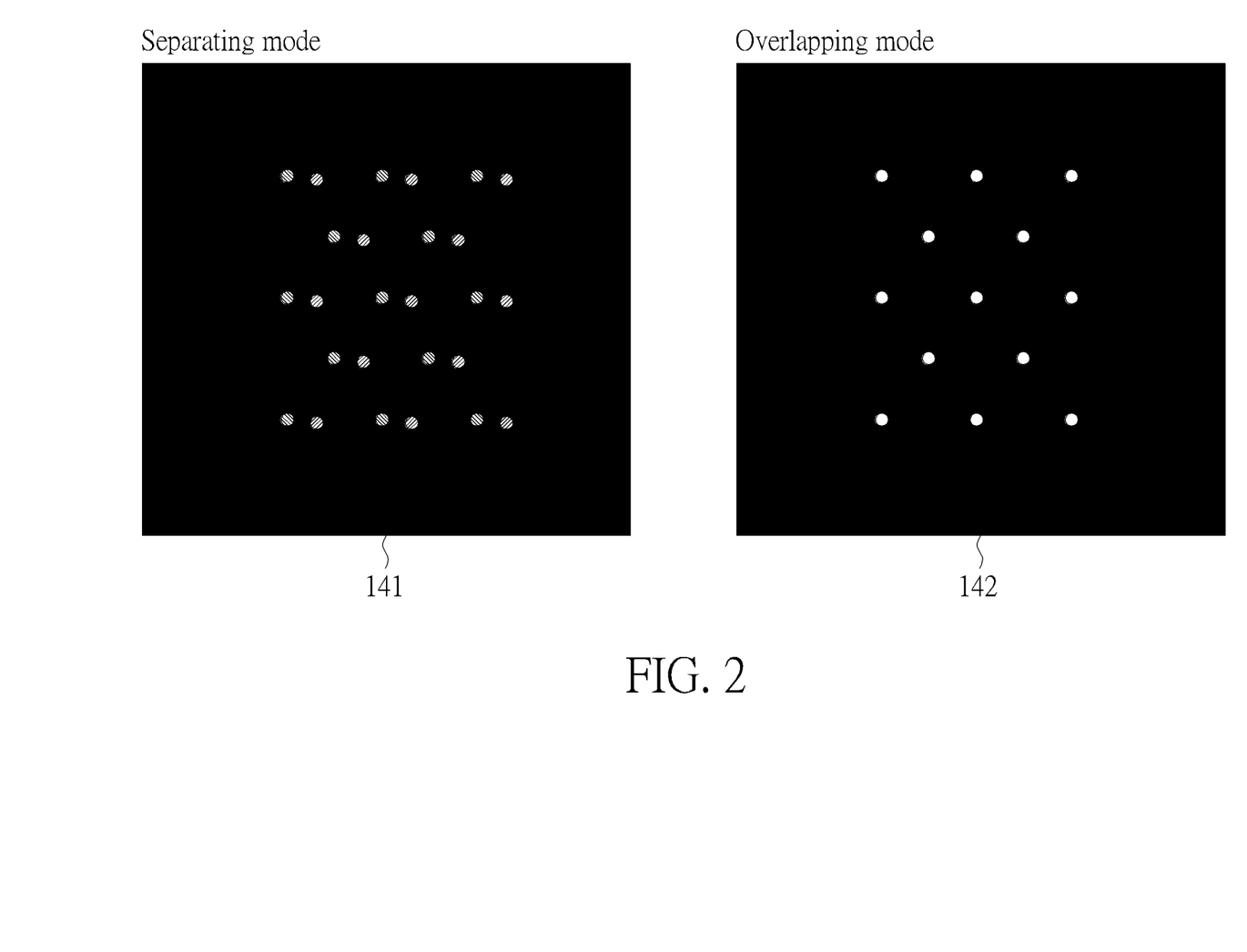
FIG. 2 is a diagram of a structure light pattern in a separating mode and a structure light pattern in an overlapping mode according to an embodiment of the present invention

Please refer to FIG. 2. FIG. 2 is a diagram of a structure light pattern 141 in the separating mode and a structure light pattern 142 in the overlapping mode according to an embodiment of the present invention. As shown in FIG. 2, the number of dots of the structure light pattern 141 in the separating mode is more than the number of dots of the structure light pattern 142 in the overlapping mode. In the present embodiment, the structure light pattern 141 in the separating mode is created and projected from the structure light source 14, and the liquid crystal lens 12 under the separating mode is controlled to pass the structure light pattern 141. The control circuit 16 can control the liquid crystal lens 12 to enter the overlapping mode by adjusting the refractive index of the liquid crystal lens 12, such that the liquid crystal lens 12 is able to converge the incident light. As a result, the plurality of dots of the structure light pattern 141 are overlapped by the liquid crystal lens 12 under the overlapping mode to form the structure light pattern 142 with fewer dots compared to the structure light pattern 141.

According to some embodiments, the structure light pattern 142 in the overlapping mode is created and projected from the structure light source 14, and the liquid crystal lens 12 under the overlapping mode is controlled to pass the structure light pattern 142. The control circuit 16 can control the liquid crystal lens 12 to enter the separating mode by adjusting the refractive index of the liquid crystal lens 12, such that the liquid crystal lens 12 is able to diverge the incident light. As a result, the plurality of dots of the structure light pattern 142 are separated by the liquid crystal lens 12 under the separating mode to form the structure light pattern 141 with more dots compared to the structure light pattern 142.

According to the above arrangement, the 3D sensing system 10 is able to control the liquid crystal lens 12 to converge or diverge the incident light, in order to separate or overlap the plurality of dots of the structure light pattern. Using the structure light pattern 141 with more dots can improve the accuracy and quality of depth image decoding. In addition, using the structure light pattern 142 with fewer dots can increase the brightness of the structure light pattern, to further increase a signal-to-noise ratio of reflected image, and improve the image quality under ambient noise caused by, for example, strong ambient light.

Figure 3:
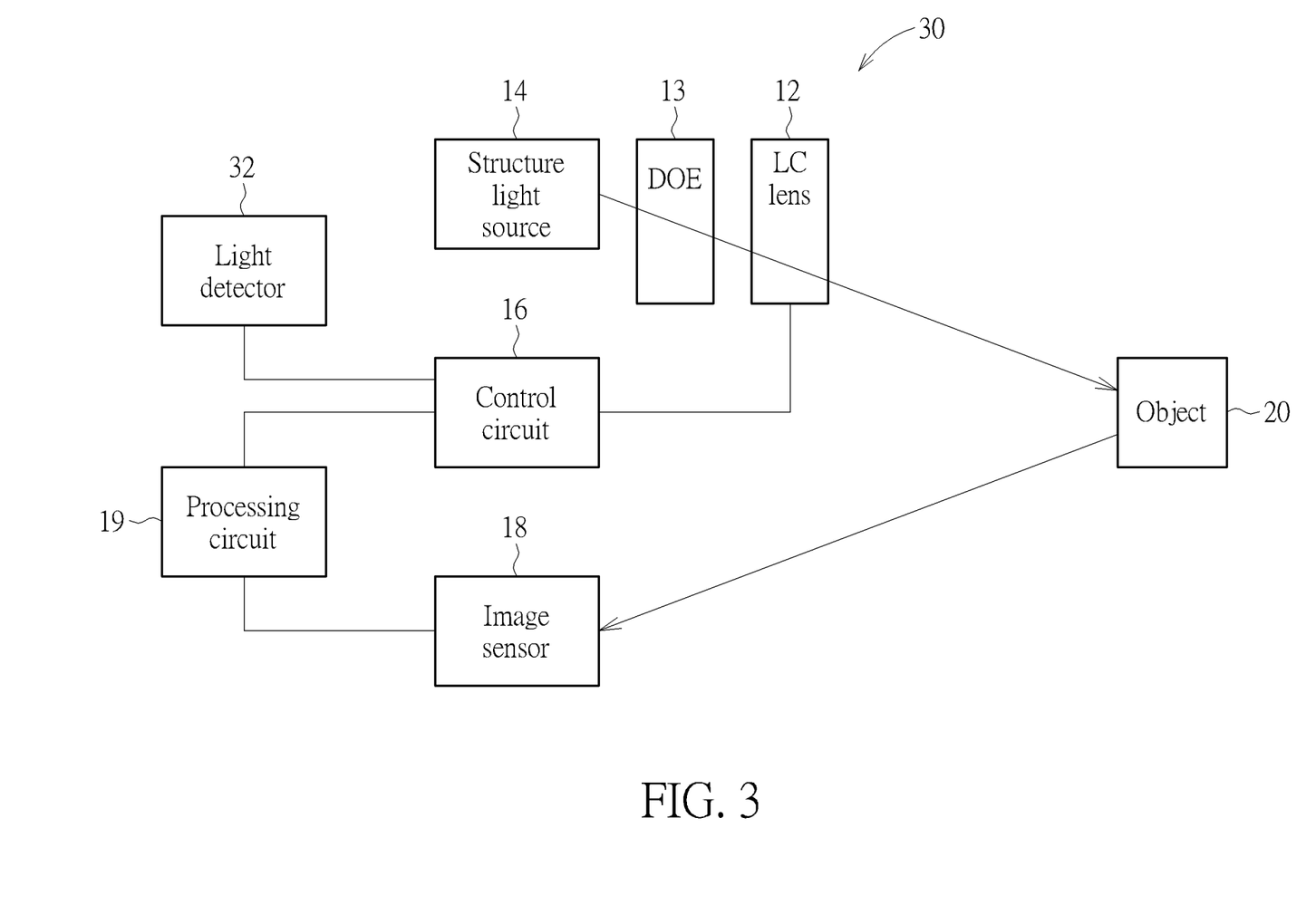
FIG. 3 is a diagram of a 3D sensing system according to a second embodiment of the present invention.

Please refer to FIG. 3. FIG. 3 is a diagram of a 3D sensing system 30 according to a second embodiment of the present invention. As shown in FIG. 3, the difference between the 3D sensing system 10 of the first embodiment and the 3D sensing system 30 of the second embodiment is that the 3D sensing system. 30 further comprises a light detector 32 electrically connected to the control circuit 16. The light detector 32 is configured to detect ambient light to generate an ambient light value. The control circuit 16 controls the liquid crystal lens 12 to enter one of the separating mode and the overlapping mode according to the ambient light value. For example, the control circuit 16 compares the ambient light value generated from the light detector 32 with a predetermined threshold value. When the ambient light value is greater than the predetermined threshold value, the control circuit 16 controls the liquid crystal lens 12 to enter the separating mode; and when the ambient light value is smaller than the predetermined threshold value, the control circuit 16 controls the liquid crystal lens 12 to enter the overlapping mode. Similarly, the liquid crystal lens 12 can be settled to converge the incident light under the overlapping mode and pass the incident light under the separating mode, or be settled to diverge the incident light under the separating mode and pass the incident light under the overlapping mode. According to the above arrangement, the liquid crystal lens 12 of the 3D sensing system 30 is able to overlap the plurality of dots of the structure light pattern, in order to increase the brightness of the structure light pattern. As a result, the plurality of dots of the structure light pattern reflected by the object 20 can be detected even in strong ambient light.

Figure 4:
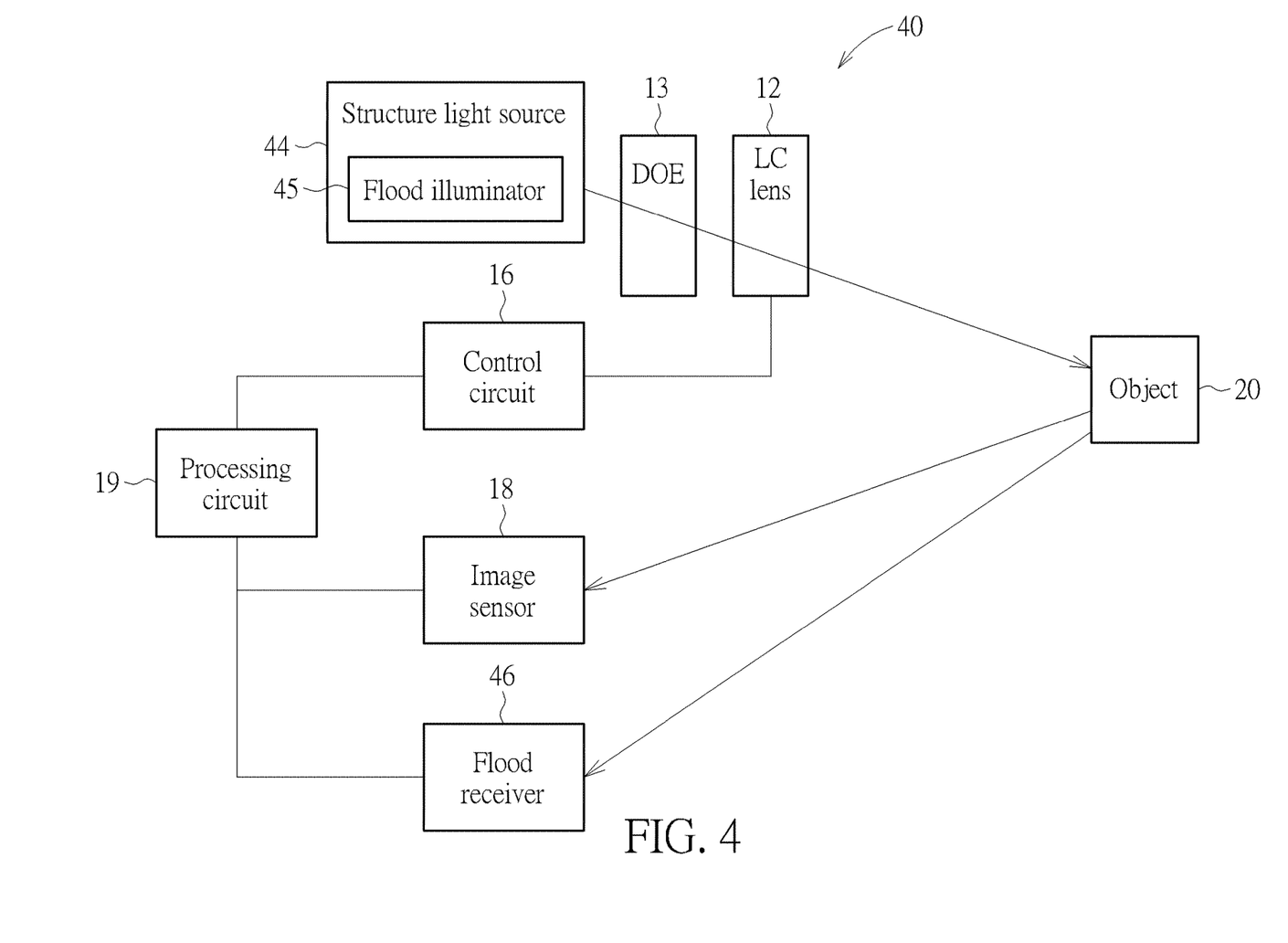
FIG. 4 is a diagram of a 3D sensing system according to a third embodiment of the present invention.

Please refer to FIG. 4. FIG. 4 is a diagram of a 3D sensing system 40 according to a third embodiment of the present invention. As shown in FIG. 4, the difference between the 3D sensing system 10 of the first embodiment and the 3D sensing system 40 of the third embodiment is that a structure light source 44 of the 3D sensing system 40 comprises a flood illuminator 45, and the 3D sensing system 40 further comprises a flood receiver 46 electrically connected to the processing circuit 19. The flood illuminator 45 configured to emit a two-dimensional (2D) image to illuminate the object 20. The flood receiver 46 is configured to receive the 2D image reflected from the object 20. The processing circuit 19 is further configured to process the 2D image reflected from the object 20 to generate a pixel grayscale statistic value. The control circuit 16 controls the liquid crystal lens 12 to enter one of the separating mode and the overlapping mode according to the pixel grayscale statistic value. For example, the control circuit 16 compares the pixel grayscale statistic value generated from the processing circuit 19 with a predetermined threshold statistic value. When ambient light is strong, the 2D image received by the flood receiver 46 is not clear, such that the processing circuit 19 may generate a lower pixel grayscale statistic value. When the pixel grayscale statistic value is greater than the predetermined threshold statistic value, the control circuit 16 controls the liquid crystal lens 12 to enter the separating mode; and when the pixel grayscale statistic value is smaller than the predetermined threshold statistic value, the control circuit 16 controls the liquid crystal lens 12 to enter the overlapping mode. In the present embodiment, the processing circuit 19 generates the pixel grayscale statistic value according to at least one of a pixel grayscale average, a pixel grayscale median and a pixel grayscale weighted average of the 2D image reflected from the object 20, but the present invention is not limited thereto. According to above arrangement, the liquid crystal lens 12 of the 3D sensing system 40 is able to overlap the plurality of dots of the structure light pattern when ambient light is strong, in order to increase the brightness of the structure light pattern. As a result, the plurality of dots of the structure light pattern reflected by the object 20 can be detected even in strong ambient light.

Figure 5:
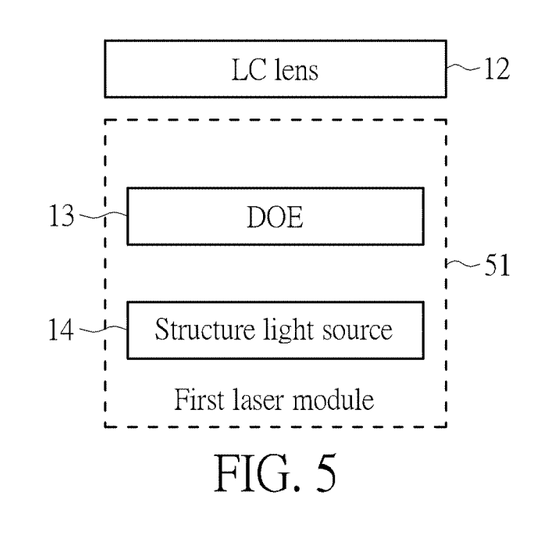
FIG. 5 is a diagram illustrating a first laser module with an external liquid crystal lens according to an embodiment of the present invention.
Figure 6:
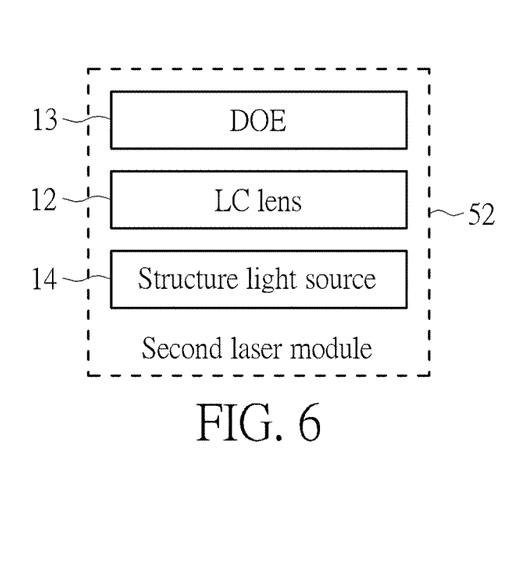
FIG. 6 is a diagram illustrating a second laser module with an internal liquid crystal lens according to an embodiment of the present invention.
Figure 7:
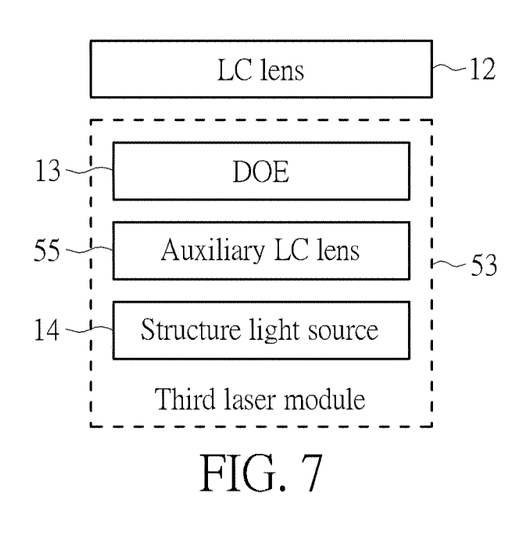
FIG. 7 is a diagram illustrating a third laser module with an external liquid crystal lens and an internal liquid crystal lens according to an embodiment of the present invention.

Specifically, the DOE 13 and the structure light source 14 may be involved in a laser module. The liquid crystal lens 12 and the auxiliary liquid crystal lens may be arranged in different positions relative to the laser module. Please refer to FIGS. 5-7. FIGS. 5-7 are diagrams illustrating different laser modules according to embodiments of the present invention. As shown in FIG. 5, a first laser module 51 comprises the DOE 13 and the structure light source 14. The liquid crystal lens 12 is arranged outside of the first laser module 51 and configured to refract a light beam emitted from the first laser module 51. The light beam is projected from the structure light source 14, and is incident on the liquid crystal lens 12 after passing through the DOE 13. In some embodiments, the liquid crystal lens can be arranged inside the laser module. For example, a second laser module 52 shown in FIG. 6 comprises the DOE 13, the structure light source 14 and the liquid crystal lens 12. In the present embodiment, a light beam is projected from the structure light source 14 to the liquid crystal lens 12. After being refracted or passed through the liquid crystal lens 12, the light beam is emitted from the second laser module 52 through the DOE 13. In some embodiments, the 3D sensing system may comprise a plurality of LC lens. For example, a third laser module 53 shown in FIG. 7 comprises an auxiliary liquid crystal lens 55, the DOE 13 and the structure light source 14. The auxiliary liquid crystal lens 55 is located between the DOE 13 and the structure light source 14. The liquid crystal lens 12 is arranged outside of the third laser module 53 and configured to refract a light beam emitted from the third laser module 53. The auxiliary liquid crystal lens 55 and the liquid crystal lens 12 are both electrically connected to a control circuit such as the control circuit 16 shown in FIG. 1, FIG. 3, or FIG. 4. In other words, any of the 3D sensing systems 10, 30, and 40 may be modified to have multiple liquid crystal lens, including the liquid crystal lens 12 and the auxiliary liquid crystal lens 55 shown in FIG. 7, and the control circuit 16 is configured to control the liquid crystal lens 12 and the auxiliary liquid crystal lens 55 to separate the plurality of dots under the separating mode, and is further configured to control the liquid crystal lens 12 and the auxiliary liquid crystal lens 55 to overlap the plurality of dots under the overlapping mode. In the present embodiment, a light beam is projected from the structure light source 14 to the auxiliary liquid crystal lens 55. After being refracted or passed through the auxiliary liquid crystal lens 55, the light beam is emitted from the third laser module 53 through the DOE 13 to the liquid crystal lens 12.

Figure 8:
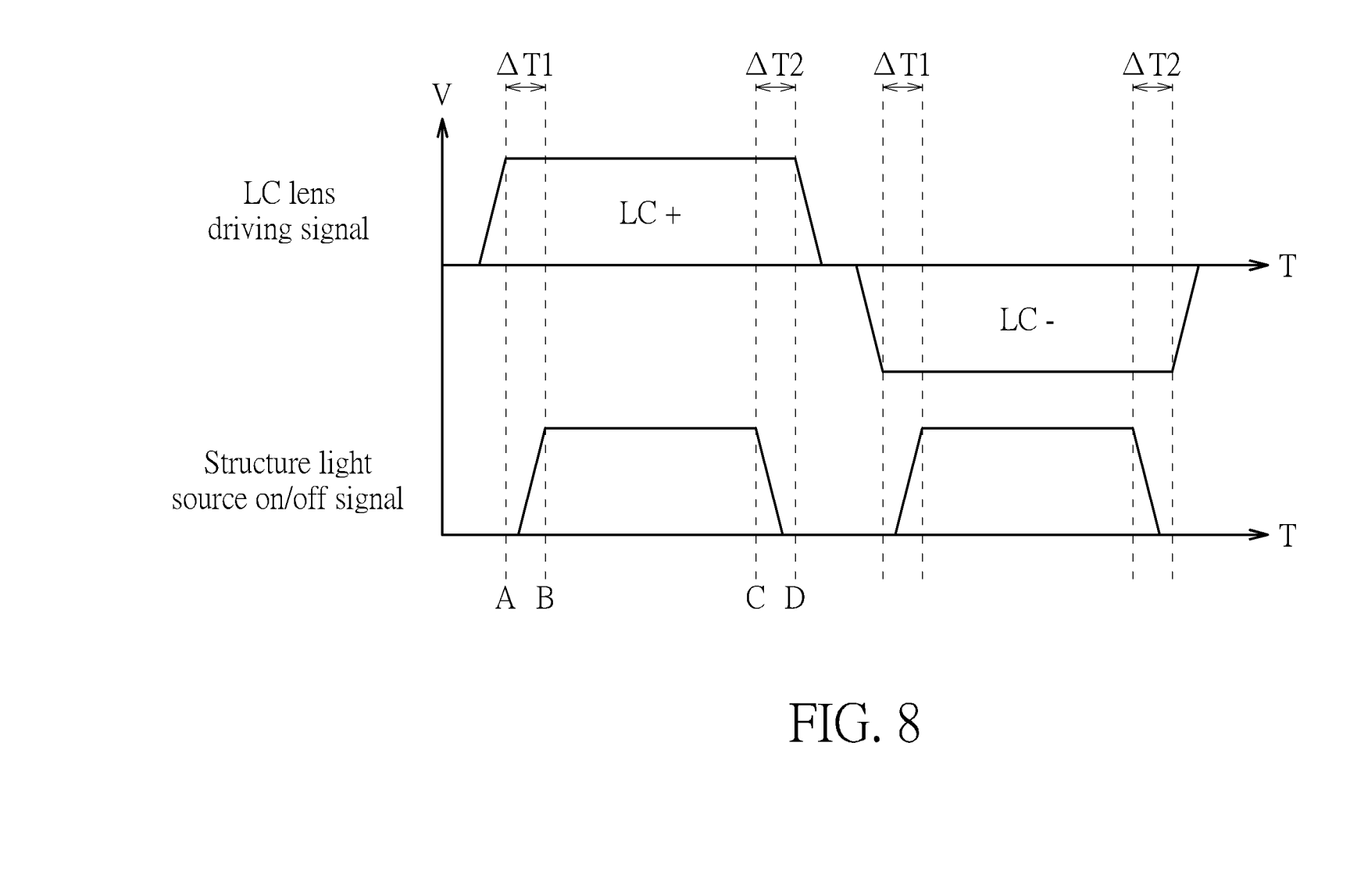
FIG. 8 is a diagram illustrating driving timing of the LC lens and the structure light source according to an embodiment of the present invention.

Specifically, liquid crystal optical components require liquid crystal response time. Regarding driving timing, a liquid crystal driving synchronization signal needs to be ahead of the turn-on timing of the structure light source 14, to prevent receiving transient image or excessive images, and to further prevent synchronization problems. Please refer to FIG. 8. FIG. 8 is a diagram illustrating driving timing of the liquid crystal lens 12 and the structure light source 14 according to an embodiment of the present invention. As shown in FIG. 6, an LC lens driving signal comprises a pulse wave LC+ and a pulse wave LC−, both of the pulse waves may turn on and turn off the liquid crystal lens 12. A structure light source on/off signal also comprises two pulse waves to turn on and turn off the structure light source 14. At a time point A, the liquid crystal lens 12 is turned on by the pulse wave LC+. A time point B is later than the time point A. There is a time period $\Delta T1$ between time points A and B. For synchronization, the structure light source 14 is turned on at the time point B. At a time point C, the structure light source 14 is turned off. A time point D is later than the time point C. There is a time period $\Delta T2$ between time points C and D. For synchronization, the liquid crystal lens 12 is turned on at the time point D. It should be noted that, compared to the liquid crystal lens 12, the structure light source 14 is turned off earlier and turned on later, in order to prevent receiving transient images and excessive images.

Figure 9:
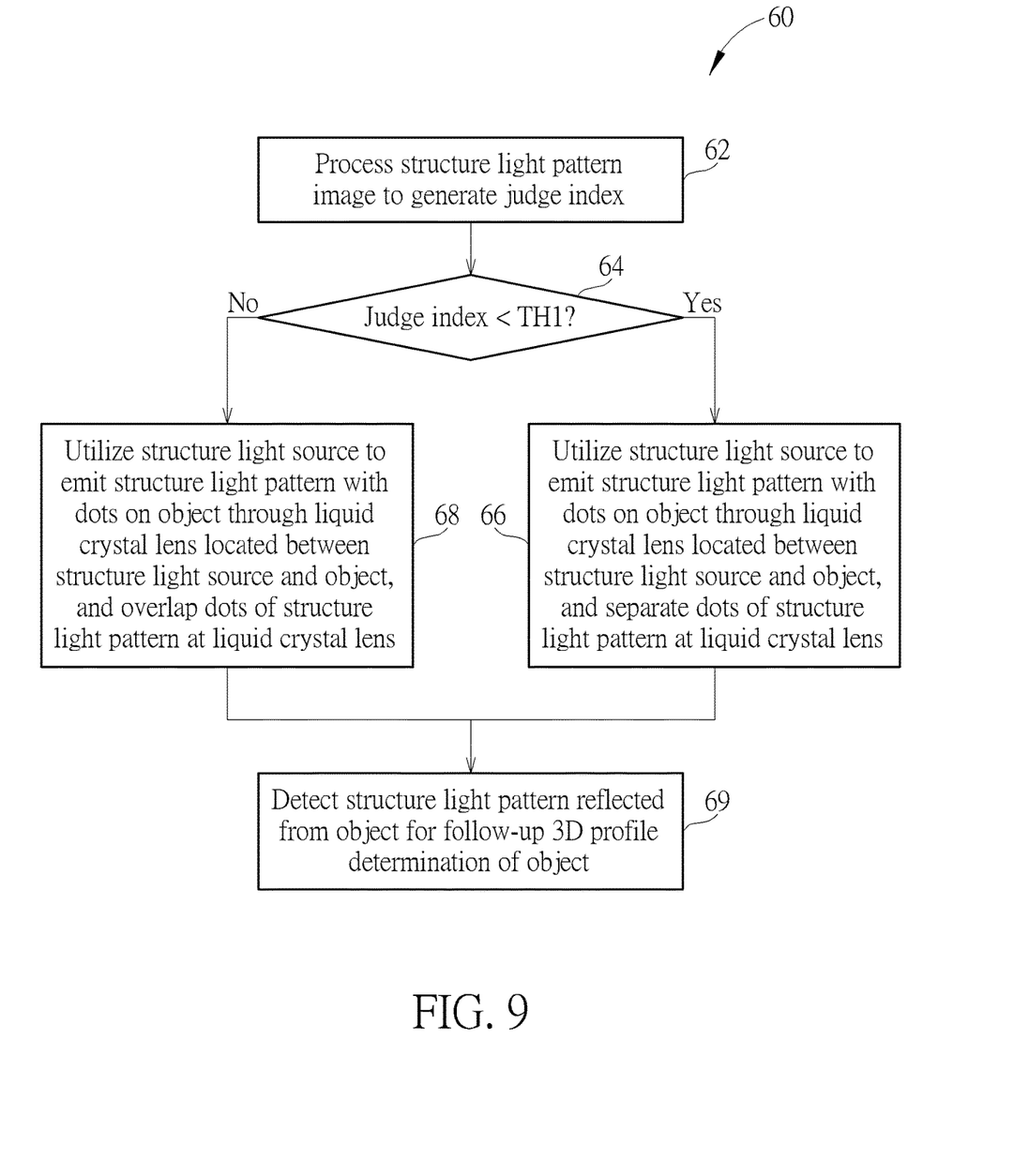
FIG. 9 is a flowchart of a first method for determining a 3D profile of the object according to an embodiment of the present invention.

Please refer to FIG. 9. FIG. 9 is a flowchart of a first method 60 for determining the 3D profile of the object according to an embodiment of the present invention. Provided that the result is substantially the same, the steps are not required to be executed in the exact order shown in FIG. 9. The method 60 of the present invention may be employed by the 3D sensing system 10 shown in FIG. 1, and may comprise following steps.

Step 62: process a structure light pattern image to generate a judge index. For example, the judge index may be derived according to at least one of a depth decode rate, a signal-to-noise ratio of the structure light pattern image and an average brightness of the structure light pattern image.

Step 64: check if the judge index is smaller than a predetermined threshold index TH1. If the judge index is smaller than the predetermined threshold index TH1, the flow proceeds with step 66. If the judge index is not smaller than the predetermined threshold index TH1, the flow proceeds with step 68.

Step 66: in response to the liquid crystal lens under the separating mode, utilize a structure light source to emit a structure light pattern with a plurality of dots on the object through the liquid crystal lens located between the structure light source and the object, and separate the plurality of dots of the structure light pattern at the liquid crystal lens.

Step 68: in response to the liquid crystal lens under the overlapping mode, utilize the structure light source to emit the structure light pattern with the plurality of dots on the object through the liquid crystal lens located between the structure light source and the object, and overlap the plurality of dots of the structure light pattern at the liquid crystal lens.

Step 69: detect the structure light pattern reflected from the object for follow-up 3D profile determination of the object.

Figure 10:
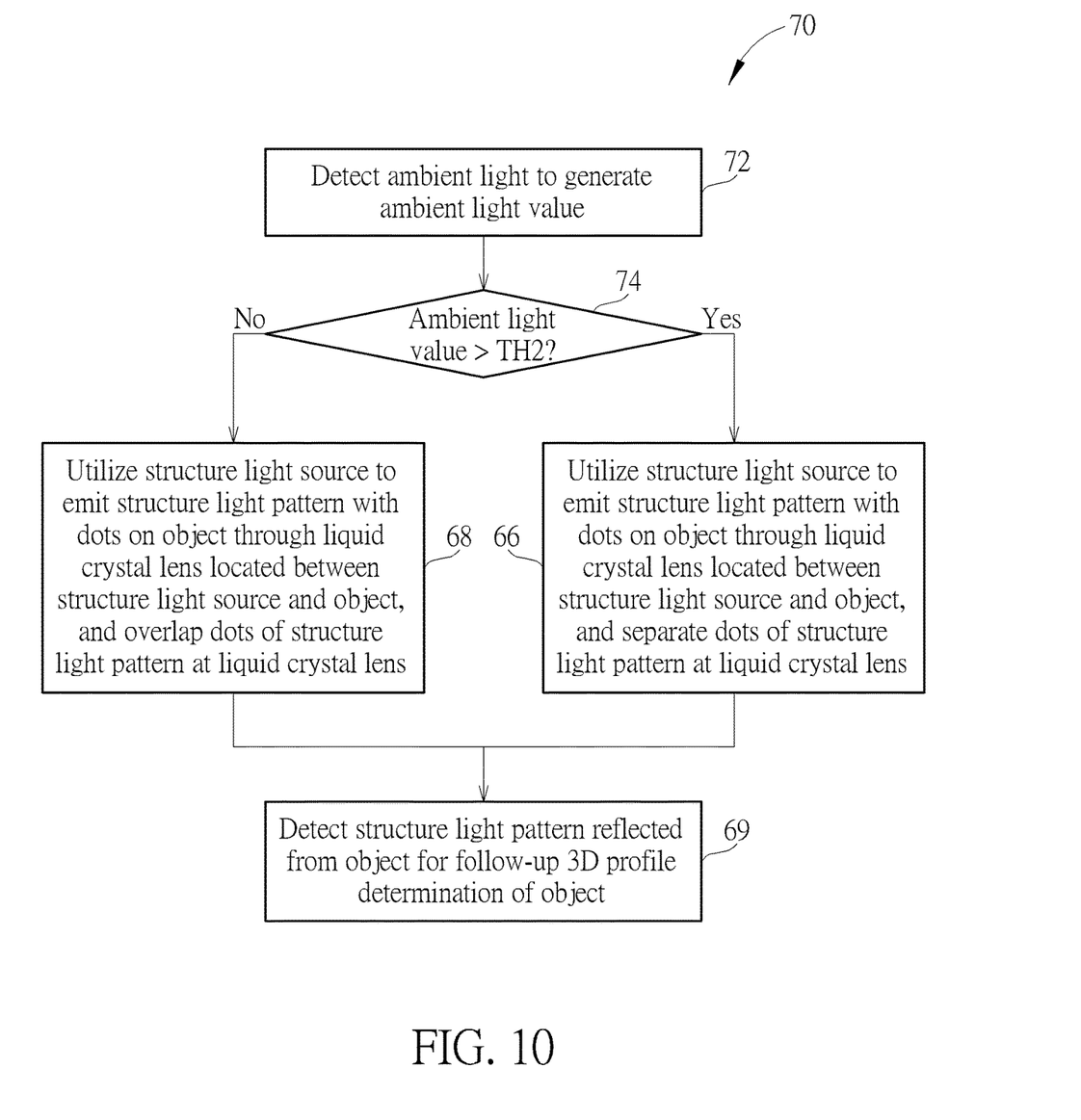
FIG. 10 is a flowchart of a second method for determining a 3D profile of the object according to an embodiment of the present invention.

Please refer to FIG. 10. FIG. 10 is a flowchart of a second method 70 for determining the 3D profile of the object according to an embodiment of the present invention. Provided that the result is substantially the same, the steps are not required to be executed in the exact order shown in FIG. 10. The method 70 of the present invention may be employed by the 3D sensing system 30 shown in FIG. 3, and may comprise following steps.

Step 72: detect ambient light to generate an ambient light value.

Step 74: check if the ambient light value is greater than a predetermined threshold value TH2. If the ambient light value is greater than the predetermined threshold value TH2, the flow proceeds with step 66. If the ambient light value is not greater than the predetermined threshold value TH2, the flow proceeds with step 68.

Step 66: in response to the liquid crystal lens under the separating mode, utilize a structure light source to emit a structure light pattern with a plurality of dots on the object through the liquid crystal lens located between the structure light source and the object, and separate the plurality of dots of the structure light pattern at the liquid crystal lens.

Step 68: in response to the liquid crystal lens under the overlapping mode, utilize the structure light source to emit the structure light pattern with the plurality of dots on the object through the liquid crystal lens located between the structure light source and the object, and overlap the plurality of dots of the structure light pattern at the liquid crystal lens.

Step 69: detect the structure light pattern reflected from the object for follow-up 3D profile determination of the object.

Figure 11:
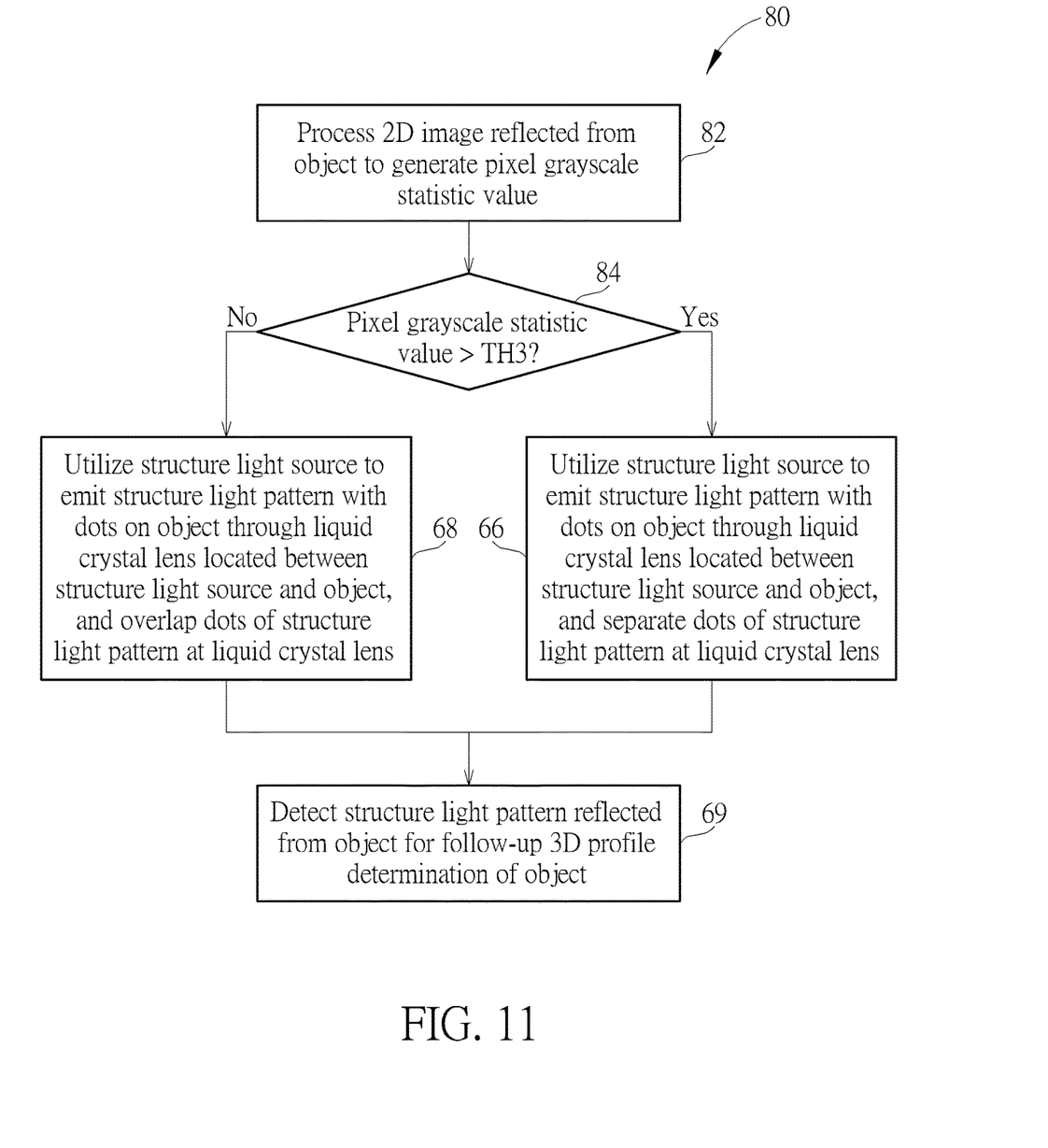
FIG. 11 is a flowchart of a third method for determining a 3D profile of the object according to an embodiment of the present invention.

Please refer to FIG. 11. FIG. 11 is a flowchart of a third method 80 for determining the 3D profile of the object according to an embodiment of the present invention. Provided that the result is substantially the same, the steps are not required to be executed in the exact order shown in FIG. 11. The method 80 of the present invention may be employed by the 3D sensing system 40 shown in FIG. 4, and may comprise following steps.

Step 82: process a 2D image reflected from an object to generate a pixel grayscale statistic value. For example, the pixel grayscale statistic value may be derived according to at least one of a pixel grayscale average, a pixel grayscale median and a pixel grayscale weighted average of the 2D image.

Step 84: check if the pixel grayscale statistic value is greater than a predetermined statistic value TH3. If the pixel grayscale statistic value is greater than the predetermined statistic value TH3, the flow proceeds with step 66. If the pixel grayscale statistic value is not greater than the predetermined statistic value TH3, the flow proceeds with step 68.

Step 66: in response to the liquid crystal lens under the separating mode, utilize a structure light source to emit a structure light pattern with a plurality of dots on the object through the liquid crystal lens located between the structure light source and the object, and separate the plurality of dots of the structure light pattern at the liquid crystal lens.

Step 68: in response to the liquid crystal lens under the overlapping mode, utilize the structure light source to emit the structure light pattern with the plurality of dots on the object through the liquid crystal lens located between the structure light source and the object, and overlap the plurality of dots of the structure light pattern at the liquid crystal lens.

Step 69: detect the structure light pattern reflected from the object for follow-up 3D profile determination of the object.

Since a person skilled in the art should readily understand details of steps shown in FIGS. 9-11 after reading above paragraphs directed to the proposed 3D sensing systems, further description is omitted here for brevity.

In contrast to the prior art, the present invention method and 3D sensing system can control the liquid crystal lens to enter the separating mode to improve the quality of depth image decoding, or to enter the overlapping mode to reduce the influence of ambient light (e.g., sunlight). When ambient noise is low, the liquid crystal lens is configured to separate the structure light to increase dots. When ambient noise is high due to, for example, strong ambient light, the liquid crystal lens is configured to overlap the dots of the structure light to increase the brightness of the structure light. Therefore, the 3D sensing system is able to adapt different usage scenarios and environments, and a signal-to-noise ratio of the structure light can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-dimensional (3D) sensing system for determining a 3D profile of an object, the 3D sensing system comprising:
   a liquid crystal lens;
   a structure light source, configured to emit a structure light pattern with a plurality of dots on the object through the liquid crystal lens located between the structure light source and the object; and
   a control circuit, electrically connected to the liquid crystal lens, wherein the control circuit is configured to control the liquid crystal lens to separate the plurality of dots under a separating mode, and the control circuit is configured to control the liquid crystal lens to overlap the plurality of dots under an overlapping mode.

2. The 3D sensing system of claim 1, further comprising:
   a light detector, electrically connected to the control circuit, and configured to detect ambient light to generate an ambient light value;
   wherein the control circuit controls the liquid crystal lens to enter one of the separating mode and the overlapping mode according to the ambient light value.

3. The 3D sensing system of claim 2, wherein when the ambient light value is greater than a predetermined threshold value, the control circuit controls the liquid crystal lens to enter the separating mode; when the ambient light value is smaller than the predetermined threshold value, the control circuit controls the liquid crystal lens to enter the overlapping mode.

4. The 3D sensing system of claim 1, further comprising:
   a diffractive optical element (DOE), located between the structure light source and the liquid crystal lens, wherein the diffractive optical element is configured to generate a light beam array.

5. The 3D sensing system of claim 4, further comprising:
an auxiliary liquid crystal lens, located between the DOE and the structure light source, electrically connected to the control circuit;
wherein the control circuit is configured to control the auxiliary liquid crystal lens to separate the plurality of dots under the separating mode, and the control circuit is configured to control the auxiliary liquid crystal lens to overlap the plurality of dots under the overlapping mode.

6. The 3D sensing system of claim 1, further comprising:
a diffractive optical element (DOE), configured to generate a light beam array, wherein the liquid crystal lens is located between the diffractive optical element and the structure light source.

7. The 3D sensing system of claim 1, further comprising:
an image sensor, configured to detect the structure light pattern reflected from the object to generate a structure light pattern image; and
a processing circuit, electrically connected to the control circuit and the image sensor, and configured to process the structure light pattern image to generate a judge index;
wherein the control circuit controls the liquid crystal lens to enter one of the separating mode and the overlapping mode according to the judge index.

8. The 3D sensing system of claim 7, wherein when the judge index is greater than a predetermined threshold index, the control circuit controls the liquid crystal lens to enter the overlapping mode; when the judge index is smaller than the predetermined threshold index, the control circuit controls the liquid crystal lens to enter the separating mode.

9. The 3D sensing system of claim 7, wherein the processing circuit generates the judge index according to at least one of a depth decode rate, a signal-to-noise ratio of the structure light pattern image and an average brightness of the structure light pattern image.

10. The 3D sensing system of claim 1, wherein the structure light source comprises a flood illuminator configured to emit a two-dimensional (2D) image to illuminate the object, and the 3D sensing system further comprises:
a flood receiver, configured to receive the 2D image reflected from the object; and
a processing circuit, electrically connected to the flood receiver and the control circuit, and configured to process the 2D image reflected from the object to generate a pixel grayscale statistic value;
wherein the control circuit controls the liquid crystal lens to enter one of the separating mode and the overlapping mode according to the pixel grayscale statistic value.

11. The 3D sensing system of claim 10, wherein when the pixel grayscale statistic value is greater than a predetermined threshold statistic value, the control circuit controls the liquid crystal lens to enter the separating mode; when the pixel grayscale statistic value is smaller than the predetermined threshold statistic value, the control circuit controls the liquid crystal lens to enter the overlapping mode.

12. The 3D sensing system of claim 10, wherein the processing circuit generates the pixel grayscale statistic value according to at least one of a pixel grayscale average, a pixel grayscale median and a pixel grayscale weighted average of the 2D image reflected from the object.

13. A method for determining a three-dimensional (3D) dimensional profile of an object, the method comprising:
in response to a liquid crystal lens under a separating mode, utilizing a structure light source to emit a structure light pattern with a plurality of dots on the object through the liquid crystal lens located between the structure light source and the object, and separating the plurality of dots of the structure light pattern at the liquid crystal lens;
in response to the liquid crystal lens under an overlapping mode, utilizing the structure light source to emit the structure light pattern with the plurality of dots on the object through the liquid crystal lens located between the structure light source and the object, and overlapping the plurality of dots of the structure light pattern at the liquid crystal lens; and
detecting the structure light pattern reflected from the object.

14. The method of claim 13, further comprising:
detecting ambient light to generate an ambient light value;
in response to the ambient light value being greater than a predetermined threshold value, controlling the liquid crystal lens to enter the separating mode; and
in response to the ambient light value being smaller than the predetermined threshold value, controlling the liquid crystal lens to enter the overlapping mode.

15. The method of claim 13, wherein detecting the structure light pattern reflected from the object comprises:
generating a structure light pattern image; and
the method further comprises:
processing the structure light pattern image to generate a judge index;
in response to the judge index being greater than a predetermined threshold index, controlling the liquid crystal lens to enter the overlapping mode; and
in response to the judge index being smaller than the predetermined threshold index, controlling the liquid crystal lens to enter the separating mode.

16. The method of claim 15, wherein the judge index is generated according to at least one of a depth decode rate, a signal-to-noise ratio of the structure light pattern image and an average brightness of the structure light pattern image.

17. The method of claim 13, wherein the structure light source comprises a flood illuminator configured to emit a two-dimensional (2D) image to illuminate the object, and the method further comprises:
receiving the 2D image reflected from the object;
processing the 2D image reflected from the object to generate a pixel grayscale statistic value;
in response to the pixel grayscale statistic value being greater than a predetermined threshold statistic value, controlling the liquid crystal lens to enter the separating mode; and
in response to the pixel grayscale statistic value being smaller than the predetermined threshold statistic value, controlling the liquid crystal lens to enter the overlapping mode.

18. The method of claim 17, wherein the pixel grayscale statistic value is generated according to at least one of a pixel grayscale average, a pixel grayscale median and a pixel grayscale weighted average of the 2D image reflected from the object.

* * * * *